United States Patent
Small et al.

(10) Patent No.: US 11,598,581 B2
(45) Date of Patent: Mar. 7, 2023

(54) FABRICATION OF CERAMICS FROM CELESTIAL MATERIALS USING MICROWAVE SINTERING AND MECHANICAL COMPRESSION

(71) Applicant: Trans Astronautica Corporation, Lake View Terrace, CA (US)

(72) Inventors: James G. Small, Sonoita, AZ (US); Joel C. Sercel, Lake View Terrace, CA (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

(21) Appl. No.: 17/668,173

(22) Filed: Feb. 9, 2022

(65) Prior Publication Data

US 2022/0268524 A1 Aug. 25, 2022

Related U.S. Application Data

(60) Provisional application No. 63/149,189, filed on Feb. 12, 2021.

(51) Int. Cl.
*F27D 99/00* (2010.01)
*C04B 35/64* (2006.01)
(Continued)

(52) U.S. Cl.
CPC .......... *F27D 99/0006* (2013.01); *C04B 35/64* (2013.01); *F27D 1/0006* (2013.01);
(Continued)

(58) Field of Classification Search
CPC .. F27D 99/0006; F27D 1/0006; F27D 1/0014; F27D 2019/0003;
(Continued)

(56) References Cited

U.S. PATENT DOCUMENTS

5,202,541 A * 4/1993 Patterson ................. H05B 6/64
219/745
5,266,762 A * 11/1993 Hoffman ................. H05B 6/62
425/174.8 E (Continued)

OTHER PUBLICATIONS

Lewis; Mining the Sky; Untold Riches from the Asteroids, Comets, and Planets; Library of Congress Cataloging-in-Publication Data; ISBN 0-201-47959-1; 1996; 66 p. (pp. 7-11, 32, 49-74, 108-127, 134-141, 198-200).

(Continued)

*Primary Examiner* — Dana Ross
*Assistant Examiner* — Joe E Mills, Jr.
(74) *Attorney, Agent, or Firm* — Knobbe, Martens, Olson & Bear, LLP

(57) ABSTRACT

Systems and methods for fabrication of ceramics from celestial materials using microwave sintering and mechanical compression for space mining applications are disclosed. In one aspect, a chamber for sintering loose mineral material into solid ceramic shapes includes a plurality of zirconia insulting plates configured to clamp the mineral material and forming a cavity in which the mineral loose material is contained, and at least one dipole array configured to generate microwave energy and apply the microwave energy to the mineral material.

15 Claims, 2 Drawing Sheets

(51) Int. Cl.
  *F27D 21/00* (2006.01)
  *F27D 1/00* (2006.01)
  *F27D 19/00* (2006.01)

(52) U.S. Cl.
  CPC .. *F27D 21/0014* (2013.01); *F27D 2019/0003* (2013.01); *F27D 2099/0028* (2013.01)

(58) Field of Classification Search
  CPC ......... F27D 2099/0028; F27D 21/0014; C04B 35/64; H05B 6/46; H05B 6/64; H05B 6/701; H05B 6/704
  USPC .................. 219/409, 600, 678, 764–780
  See application file for complete search history.

(56) References Cited

U.S. PATENT DOCUMENTS

| | | | | |
|---|---|---|---|---|
| 5,674,794 | A * | 10/1997 | Chatterjee | C04B 35/64 264/681 |
| 6,350,973 | B2 * | 2/2002 | Wroe | H05B 6/62 219/601 |
| 2003/0224082 | A1 * | 12/2003 | Akopyan | B29C 35/0805 425/174.4 |
| 2011/0031238 | A1 * | 2/2011 | Segawa | F27B 5/14 219/759 |
| 2011/0315678 | A1 * | 12/2011 | Furuya | H05B 6/701 219/690 |
| 2016/0121395 | A1 * | 5/2016 | Kawanaka | C22C 32/0073 219/121.64 |

OTHER PUBLICATIONS

Sercel, J.C., et al., "APIS(Asteroid Provided in-Situ Supplies): 100MT of Water, One Falcon 9 Launch" NIAC Phase 1a proposal submitted Nov. 2014.
Sanders. G , Nasa Lunar ISRU Strategy. 2019.

* cited by examiner

Replacement Sheet

FABRICATION OF CERAMICS FROM CELESTIAL MATERIALS USING MICROWAVE SINTERING AND MECHANICAL COMPRESSION

INCORPORATION BY REFERENCE TO ANY PRIORITY APPLICATION(S)

This application is based upon and claims the benefit of priority from U.S. Provisional Patent Application No. 63/149,189 filed on Feb. 12, 2021. Moreover, any and all applications for which a foreign or domestic priority claim is identified in the Application Data Sheet as filed with the present application are hereby incorporated by reference under 37 CFR 1.57. The entire contents of each of the above-listed item(s) is hereby incorporated into this document by reference and made a part of this specification for all purposes, for all that each contains.

BACKGROUND

Technological Field

The present systems and methods relate to fabrication from a mixture of minerals available in lunar soils (regolith) or other materials obtained from celestial bodies. For example, structurally useful ceramic components can be fabricated.

SUMMARY OF CERTAIN INVENTIVE ASPECTS

Lunar surface construction for habitats and for mining or manufacturing bases on the Moon or other celestial bodies will require that large quantities of concrete-like materials be fabricated locally. In-situ resource utilization (ISRU) can use locally available resources from the lunar regolith (e.g., lunar soils) to fabricate useful materials and/or structures. Traditional terrestrial fabrication methods for both concrete and construction brick materials require large quantities of water, making those methods infeasible for near-term lunar industrial processes. In the case of fired bricks, the wet molded clay materials are partially dried and then slowly heated in kilns over a period of several days to reach a maximum temperature of 900° C. to no more than 1100° C. Higher temperatures result in brittle bricks with reduced mechanical strength.

Aspects of this disclosure provide improved systems and methods for fabricating structurally useful ceramic components from a mixture of minerals available in lunar soils (regolith) or other materials obtained from celestial bodies.

One aspect is a chamber for sintering loose mineral material into solid ceramic shapes, comprising: a plurality of zirconia insulting plates configured to clamp the mineral material and forming a cavity in which the mineral material is contained; and at least one dipole array configured to configured to generate microwave energy and apply the microwave energy to the loose mineral material, thereby sintering the material into a solid ceramic having the shape of the cavity.

In some embodiments, the chamber further comprises: a mechanical vice configured to apply uniaxial pressure to the mineral material via at least two of the zirconia insulating plates.

In some embodiments, the chamber further comprises: a pair of pusher plates, each of the pusher plates arranged between the mechanical vice and one of the zirconia insulating plates.

In some embodiments, the chamber further comprises: a pair of alumina ceramic plate, each of the alumina ceramic plates arranged between one of the pusher plates and one of the zirconia insulating plates.

In some embodiments, the at least one dipole array comprises a first dipole array positioned above the cavity and a second dipole array positioned above the cavity.

In some embodiments, the first and second dipole arrays are polarized orthogonally to each other.

In some embodiments, the at least one dipole array is embedded in at least one of the zirconia insulating plates.

In some embodiments, the chamber further comprises: at least one microprocessor configured to control the at least one dipole array to apply the microwave energy over limited periods of time followed by periods of time without applying the microwave energy to allow thermal hotspots to periodically diffuse energy to adjacent cooler areas within the mineral material.

In some embodiments, the chamber further comprises: a plurality of thermocouple temperature sensors configured to measure spatial thermal equalization within the mineral material.

In some embodiments, the chamber further comprises: a vacuum chamber configured to provide vacuum conditions to the mineral material.

Another aspect is a method for sintering loose mineral material into solid ceramic shapes, comprising: applying electromagnetic wave heating simultaneously with mechanical pressure to the mineral material.

In some embodiments, the mineral material is obtained from lunar regolith.

In some embodiments, the mechanical pressure is uniaxial and applied from a vice.

In some embodiments, heating is applied over limited periods of time followed by periods of time without heating to allow thermal hotspots to diffuse to adjacent cooler areas.

In some embodiments, multiple temperature sensors are used to detect the presence of hotspots and are used to adjust the duration of heating time periods and non-heating time periods using electronic controllers.

In some embodiments, mineral material is sintered in a vacuum environment.

In some embodiments, mineral material is sintered directly into standardized shapes used in civil engineering construction including at least one of the following: paver plates, bricks, interlocking blocks, load bearing rods, or beams.

In some embodiments, radio frequency or microwave energy is coupled into mineral material from radiating antennas of spatial extent equal to or substantially larger than the wavelength of the radiant energy.

In some embodiments, the radiating antennas comprise dipole arrays.

In some embodiments, several radiating antennas are arranged to have mutual orthogonal polarizations.

DETAILED DESCRIPTION

Problem

Multiple studies have explored the direct sintering or melting of lunar regolith and simulated regolith materials by application of heat and pressure over time in vacuum conditions. Sintering methods can produce water-free ceramic materials of varying mechanical properties. Pressureless sintering (PLS) using microwave heating without external applied pressure typically produces crumbly, low-strength material. The crumbly nature is confirmed by laboratory results shown in FIGS. 1A-1C.

Figure 1A:
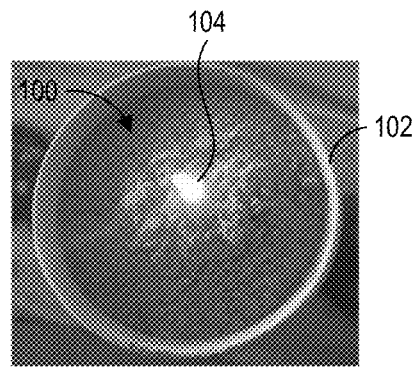
FIGS. 1A-1C illustrate hotspot formation when constant microwave heating power is applied to a quantity of loose (e.g., powdered) simulated regolith.
Figure 1B:
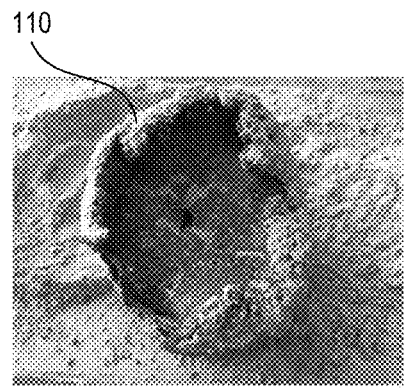
Figure 1C:
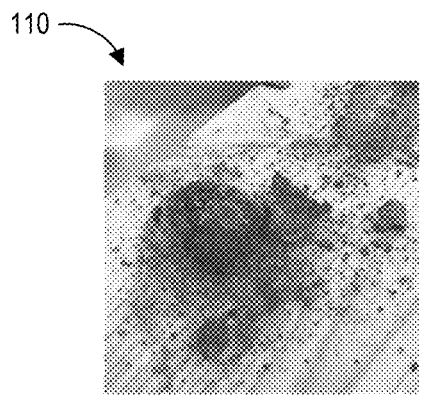

FIG. 1A illustrates a loose (e.g., powdered) sample of simulated of lunar highland regolith 100 which is heated in a crucible 102 by microwave power in a commercial microwave oven. An incandescent hotspot 104 is generated by runaway thermal absorption within the regolith sample 100. FIG. 1B illustrates a sintered hotspot 110 resulting from the use of the commercial microwave oven from FIG. 1A. The sintered hotspot 110 measures approximately 5 mm in diameter in the illustrated example. FIG. 1C illustrates the relatively low structural strength of the sintered hotspot 110, which crumbles under relatively low pressure or applied force.

Zhang et al. ("Microstructure evolution during spark plasma sintering of FJS-1 lunar soil simulant". Journal of the American Ceramics Society, Vol 103, Issue 2, February 2020, hereinafter "Zhang [2020]") describes heating lunar soil simulant type FJS-1 from the Shimizu Corporation, Japan. In those studies, a higher strength ceramic was produced by heating simulant to 1050° C. for 10 minutes at a uniaxial compression pressure of 100 MPa. The heating method was spark plasma sintering (SPS) in a graphite die of 20 mm diameter. The resulting ceramic had mechanical properties of compressive strength approximately 220 MPa and flexural strength approximately 38 MPa, which are 10 times stronger than typical concrete fabrications.

The SPS method reported by Zhang [2020] produced an impressively strong sintered material. However, for two primary reasons, it is not realistic to directly extrapolate from centimeter-scale samples to a process for production of large paver tiles or other structural construction components. First, the runaway thermal absorption of lunar regolith reported by Taylor et al. (Taylor Lawrence A, Meek Thomas T, "Microwave Sintering of Lunar Soil: Properties, Theory, and Practice". Journal of Aerospace Engineering, 18(3) July 2005, hereinafter "Taylor [2005]") leads to formation of small hot spots, as shown in FIGS. 1A-1C. Hotspot formation is typically not evident in small sample fabrications (e.g., because the sample is simply not large enough to demonstrate uneven heating phenomena, even if they would be present using a similar approach in a larger sample). A method is needed to overcome the hotspot problem. Second, the SPS method requires that graphite electrodes be in direct contact with the sintered material. Zhang [2020] placed sacrificial graphite paper sheets between the electrodes and simulant to prevent bonding to the electrode material. That is not a practical approach for large volume fabrication on the lunar surface or on other celestial bodies.

Fabrication of Usefully Large Components

In an example method provided herein, electrode contamination can be mitigated by the use of electrodeless microwave power heating. As described herein, the chamber design illustrated in FIG. 2 permits microwave power to volumetrically heat a usefully large quantity of regolith. The chamber can also establish the dimensions of the finished ceramic components, for example pavers or bricks. The chamber can further provide for uniaxial compression pressures of up to 100 MPa.

The chamber uses an array of microwave-radiating dipole antennas. The multiple antennas (e.g., working together) can yield substantially uniform volumetric heating through the surface and into the volume of regolith material. By using many dipole elements, the resulting fabricated ceramic components can be much larger than the centimeter wavelength of the microwave radiation.

Compression pressure can be applied by a mechanical device (e.g., one or more vices). Pressure can be applied to the sintering regolith through pressure plates which act on the assembly of dipole arrays. In some embodiments, the pressure plates can be integrally formed with, contain, or comprise radiating elements (such as dipole arrays). The dipoles can comprise conducting metal traces of a high melting temperature metal alloy, such as stainless steel. It can be advantageous for the conducting metal to have a melting temperature substantially higher than the sintering temperature of the regolith. In some cases, standard copper traces may not meet the temperature requirement. The conducting dipole traces can be imbedded in high-temperature and microwave-transparent ceramic plates, such as alumina or zirconia. The layered assembly of dipole antennas and ceramic plates can transmit compressive force (e.g., from a vice) while causing substantially uniform uniaxial compression, thereby enhancing the result of sintering the regolith. Thus, application of compressive force and heating energy can be accomplished through complementary and/or combined structures. Antenna arrays can radiate energy and also form part of a vice structure or pressure plate. Thus, proximity of radiation emitters can be improved by incorporation into a force-applying structure.

Prevention of Hotspot Formation by a Step Heating Method

When regolith is heated, its microwave absorption coefficient increases. Areas of warmer regolith may absorb a greater amount of microwave radiation, resulting in even faster heating than adjacent cooler areas of the regolith. With a substantially constant input heating power, localized thermal runaway may occur in some configurations, as shown in FIGS. 1A-1C. Moreover, materials to be sintered (regolith) may not have uniform properties or distributions of underlying matter. If denser rocks and looser dust are both included within a mixture of raw materials, for example, heat conduction may already occur in a non-uniform way even before non-uniformities caused by the initial heat entry. Accordingly, hotspots are a risk during a heating process with potentially non-uniform materials (such as regolith or other outputs from a mining or mineral gathering process).

Step heating can help mitigate hotspot formation. Microwave heating power is applied as uniformly as possible or practical for a few seconds throughout the entire volume of the sample. Even under highly uniform microwave heating, some regions may absorb heat at a faster rate than other regions. Heating is then stopped to allow heat from the warmer regions to diffuse into the cooler regions of the material. The net result is that the temperature of the entire sample has been raised and any hotspots have dispersed their energy. Heating steps followed by pauses for thermal equilibration are repeated until the final temperature goal of the material (e.g., regolith) is reached.

The times for heating and thermal diffusion may be estimated. Consider the heat required to raise the temperature of a subscale paver-tile or brick (10 cm×10 cm×4 cm) by $\Delta T=10°$ C. Assume the volume of loose regolith is V=10 cm×10 cm×4 cm=400 cm$^3$=4×10$^{-4}$ m$^3$; density, $\rho$=2 g $cm^{-3}$=2×10$^3$ kg$^{-3}$; mass of regolith, m=ρV=8×10$^{-1}$ kg; specific heat of typical quartz, σ=700 J K$^{-1}$ kg$^{-1}$. The required heat Q is given by:

$$Q = \sigma \rho V \Delta T = 5,600 \text{ Joules}$$

For an example 1 kW of microwave heating power, the time to heat may be, t=5.6 seconds. If 30 seconds are allowed to reach thermal equilibration and 100 steps needed to raise the ΔT by 1000° C., then the total time to heat can be calculated as, Δt=3560 seconds=0.988 hour. The time to heat an example larger 1 m×1 m×4 cm paver tile may be approximately the same if a heat-inducing structure (e.g., the dipole array) is sufficiently large to heat the regolith with substantial uniformity and if the input microwave power is scaled higher in proportion to the total mass of the heated material (e.g., regolith).

Figure 2:
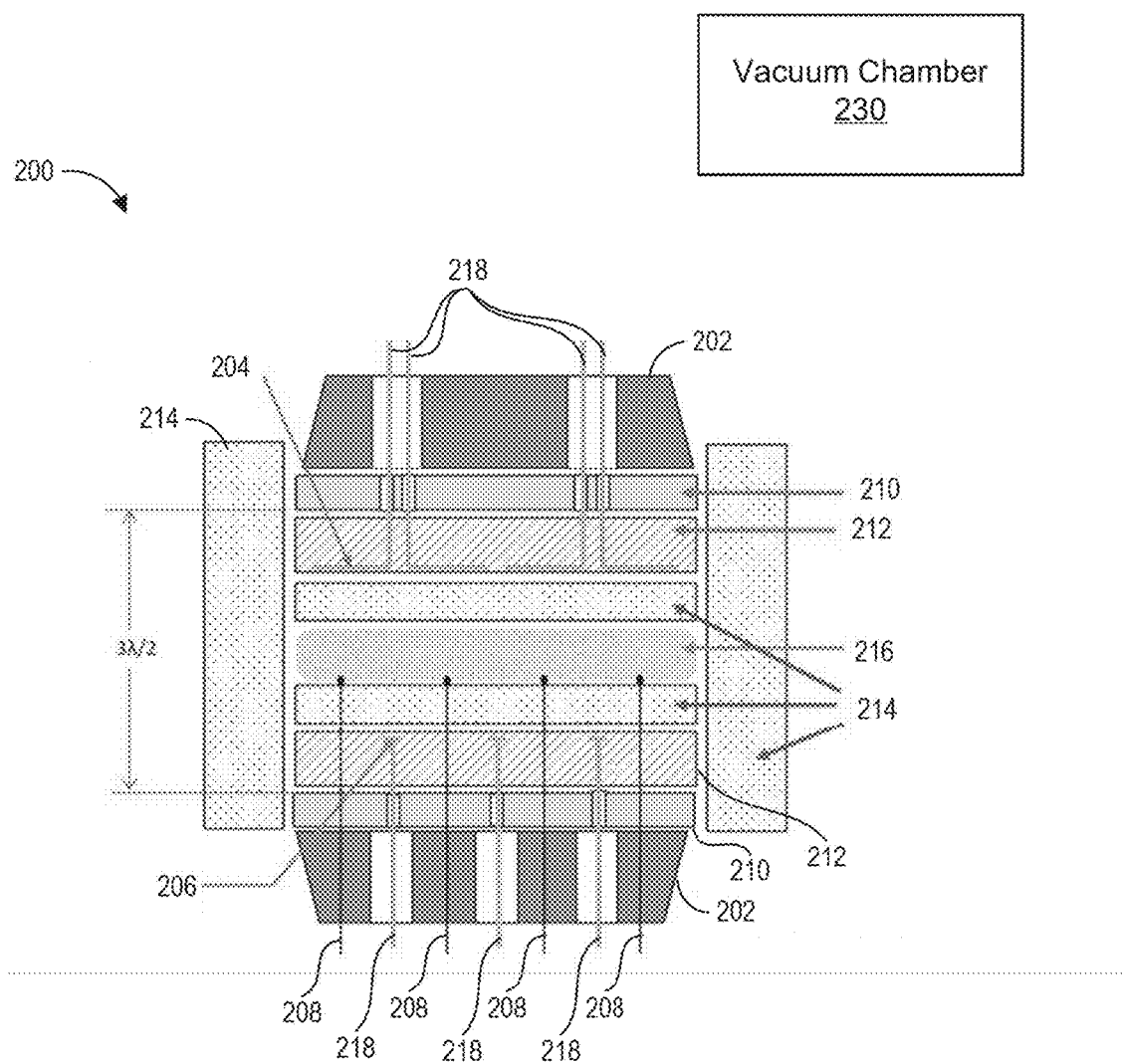
FIG. 2 shows an exploded view of an example microwave-powered sintering chamber in accordance with aspects of this disclosure.

FIG. 2 illustrates an example chamber 200 design for microwave sintering of lunar landing pad pavers using a step heating method disclosed herein. In particular, FIG. 2 is a partially exploded view of an embodiment of the sintering chamber 200 showing regolith material 216 clamped between zirconia insulating plates 214. The zirconia insulating plates 214 may form a cavity in which the loose regolith material 216 is contained during sintering. For simplicity, several details are omitted or illustrated in simplified block form in this figure, including the vacuum chamber 230, mounting supports in the vacuum chamber 230, and motorized lead screws on the vice clamping mechanism. Those skilled in the art will recognize how to implement the chamber 200 including the additional elements of the vacuum chamber 230, the mounting supports in the vacuum chamber 230, and the motorized lead screws on the vice clamping mechanism.

The chamber 200 design can be scalable to much larger sizes. Some of the design features of the chamber 200 include: vacuum operation, application of uniaxial pressure up to 100 MPa through a mechanical vice 202, multi-kilowatt microwave input power from dipole arrays including a top dipole array 204 and a bottom dipole array 206, and a plurality of temperature measurements through thermocouple temperature sensors 208 to measure spatial thermal equalization. The chamber 200 also includes a pair of stainless steel pusher plates 210, a pair of alumina ceramic plates 212, and a plurality of zirconia thermal insulators 214. The chamber 200 is configured to sinter loose regolith material 216 (e.g., powder) enclosed by the zirconia thermal insulators 214. In certain embodiments, some or all of the electronic functions can be measured and controlled by one or more microprocessors.

The sintering process can proceed by clamping the regolith material 216 between the zirconia thermal insulator plates 214 which are relatively transparent to microwave energy. The top and bottom dipole arrays 204 and 206 can be imbedded in the aluminum ceramic insulator plates 212 which position the dipoles about a quarter wavelength (λ/4) away from stainless steel pusher plates 210. This spacing may be used for dipole arrays in various applications. The use of dipole arrays 204 and 206 can allow the microwave energy to be almost uniformly distributed across an arbitrarily large surface area. This can enable the design to be scaled to larger sintering chambers 200. The microwave heating provided by the dipole arrays 204 and 206 may be augmented or replaced by applying (e.g., additional) bulk heating through externally applied electrical resistive heating and/or concentrated solar energy applied to the exterior of the sintering chamber 200, for example.

The upper and lower stainless steel pusher plates 210 can be spaced apart by approximately three half wavelengths (3λ/2) electrical distance in the microwave field to provide for a standing wave maximum at the center of the loose regolith material. The upper dipole array 204 may be polarized orthogonally to the lower dipole array 206, providing for effectively two independent standing waves in the heating chamber 200.

Finally, thermocouple temperature probes 208 are shown embedded in the surface of the zirconia plates 214 adjacent to the loose regolith material 216. The electrical connections to these temperature probes 208 may be arranged parallel to the transmission lines 218 for the dipole arrays 204 and 206. In some embodiments, the electrical connections 218 will have minimal interaction with the strong microwave radiation from either of the dipole arrays 204 and 206.

In some embodiments, some or all of the materials used in the sintering chamber 200 are suitable for temperatures substantially higher than 1050° C. for sintering. Since copper has a melting temperature of about 1083° C., it may or may not be used for the dipole arrays 204 and 206. The dipoles included in the dipole arrays 204 and 206 may be fabricated from stainless steel which has a manageably small electrical loss and has a typical melting temperature of approximately 1400° C. depending upon the specific alloy. Type K thermocouples may be used up to about 1260° C. All of the example materials are readily available.

While aspects of this disclosure relate to systems and methods for sintering regolith into ceramic materials without the use of water, water obtained locally from a celestial body can also be used to fabricate concrete-like materials. For example, water can be obtained as described in U.S. Patent Publication No. 2020/0240276 and U.S. patent application Ser. No. 17/448,349 filed Sep. 21, 2021, each of which is incorporated by reference in its entirety.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description is not intended to be exhaustive or to limit the invention to the precise form disclosed above. While specific embodiments of, and examples are described above for illustrative purposes, various equivalent modifications are possible within the scope of the disclosed invention(s), as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be extracted, subdivided, and/or combined to provide further embodiments.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally. Thus, a remote device may include a device which is physically located in the same general area and connected via a device such as a switch or a local area network. In other situations, a remote device may also be located in a separate geographic area, such as, for example, in a different location, building, valley, and so forth.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

The invention claimed is:

1. A chamber for sintering loose mineral material into solid ceramic shapes, comprising:
   a plurality of zirconia insulting plates configured to clamp the mineral material and forming a cavity in which the mineral material is contained;
   at least one dipole array configured to generate microwave energy and apply the microwave energy to the loose mineral material, thereby sintering the material into a solid ceramic having the shape of the cavity;
   a mechanical vice configured to apply uniaxial pressure to the mineral material via at least two of the zirconia insulating plates;
   a pair of pusher plates, each of the pusher plates arranged between the mechanical vice and one of the zirconia insulating plates; and
   a pair of alumina ceramic plates, each of the alumina ceramic plates arranged between one of the pusher plates and one of the zirconia insulating plates.

2. A chamber for sintering loose mineral material into solid ceramic shapes, comprising:
   a plurality of zirconia insulting plates configured to clamp the mineral material and forming a cavity in which the mineral material is contained;
   at least one dipole array configured to generate microwave energy and apply the microwave energy to the loose mineral material, thereby sintering the material into a solid ceramic having the shape of the cavity;
   wherein the at least one dipole array comprises a first dipole array positioned above the cavity and an orthogonally polarized second dipole array positioned below the cavity.

3. The chamber of claim 1, wherein the at least one dipole array is embedded in at least one of the zirconia insulating plates.

4. The chamber of claim 1, further comprising:
   at least one microprocessor configured to control the at least one dipole array to apply the microwave energy over limited periods of time followed by periods of time without applying the microwave energy to allow thermal hotspots to periodically diffuse energy to adjacent cooler areas within the mineral material.

5. The chamber of claim 1, further comprising:
a plurality of thermocouple temperature sensors configured to measure spatial thermal equalization within the mineral material.

6. The chamber of claim 1, further comprising:
a vacuum chamber configured to provide vacuum conditions to the mineral material.

7. A method for sintering loose mineral material into solid ceramic shapes, comprising:
applying electromagnetic wave heating simultaneously with mechanical pressure to the mineral material;
wherein radio frequency or microwave energy is coupled into mineral material from radiating antennas of spatial extent equal to or larger than the wavelength of the radiant energy.

8. The method of claim 7 where the mineral material is obtained from lunar regolith.

9. The method of claim 7 where mechanical pressure is uniaxial and applied from a vice.

10. The method of claim 7 wherein heating is applied over limited periods of time followed by periods of time without heating to allow thermal hotspots to diffuse to adjacent cooler areas.

11. The method of claim 10 where multiple temperature sensors are used to detect the presence of hotspots and are used to adjust the duration of heating time periods and non-heating time periods using electronic controllers.

12. The method of claim 7 where mineral material is sintered in a vacuum environment.

13. The method of claim 7 where mineral material is sintered directly into standardized shapes used in civil engineering construction including at least one of the following: paver plates, bricks, interlocking blocks, load bearing rods, or beams.

14. The method of claim 7 where the radiating antennas comprise dipole arrays.

15. The method of claim 7 where several radiating antennas are arranged to have mutual orthogonal polarizations.

* * * * *